US011645948B2

(12) United States Patent
Moon et al.

(10) Patent No.: US 11,645,948 B2
(45) Date of Patent: May 9, 2023

(54) CAPTURE PLATE ASSEMBLY FOR BRAILLE DISPLAY

(71) Applicant: Tactile Solutions, Inc., Lafayette, IN (US)

(72) Inventors: Alexander Moon, West Lafayette, IN (US); Thomas Baker, West Lafayette, IN (US); David A. Schleppenbach, Lafayette, IN (US)

(73) Assignee: Tactile Solutions, Inc., Lafayette, IN (US)

( * ) Notice: Subject to any disclaimer, the term of this patent is extended or adjusted under 35 U.S.C. 154(b) by 99 days.

(21) Appl. No.: 17/197,621

(22) Filed: Mar. 10, 2021

(65) Prior Publication Data

US 2021/0287569 A1 Sep. 16, 2021

Related U.S. Application Data

(60) Provisional application No. 62/987,416, filed on Mar. 10, 2020.

(51) Int. Cl.
*G09B 21/00* (2006.01)
(52) U.S. Cl.
CPC .................. *G09B 21/004* (2013.01)
(58) Field of Classification Search
CPC .................................. G09B 21/004
See application file for complete search history.

(56) References Cited

U.S. PATENT DOCUMENTS

| 5,685,721 | A | * | 11/1997 | Decker | G09B 21/003 |
| | | | | | 434/114 |
| 7,097,457 | B2 | * | 8/2006 | Kajino | G09B 21/004 |
| | | | | | 434/112 |
| 8,360,778 | B2 | * | 1/2013 | Murphy | G09B 21/004 |
| | | | | | 434/112 |
| 10,163,367 | B2 | * | 12/2018 | Moon | G09B 21/004 |
| 10,249,217 | B2 | * | 4/2019 | Moon | G09B 21/004 |
| 10,692,637 | B2 | * | 6/2020 | Zarate | G09B 21/004 |
| 11,011,075 | B1 | * | 5/2021 | Israr | G10L 13/00 |
| 11,145,223 | B2 | * | 10/2021 | Califorrniaa | G09B 21/007 |
| 11,410,574 | B2 | * | 8/2022 | Yang | G09B 21/004 |
| 11,455,910 | B2 | * | 9/2022 | Bailey | G09B 21/02 |
| 2002/0106614 | A1 | * | 8/2002 | Prince | G09B 21/003 |
| | | | | | 434/114 |

(Continued)

FOREIGN PATENT DOCUMENTS

| DE | 102014011326 A1 | * | 2/2016 | .......... G09B 21/003 |
| KR | 101179043 B1 | * | 9/2012 | ............ G09B 21/02 |

(Continued)

OTHER PUBLICATIONS

International Patent Application No. PCT/US2021/021655 International Search Report and Written Opinion dated May 25, 2021. 10 pages.

*Primary Examiner* — Vinh T Lam
(74) *Attorney, Agent, or Firm* — Woodard, Emhardt, Henry, Reeves & Wagner, LLP; Matthew M. Gardlik

(57) ABSTRACT

The present disclosure relates to tactile displays, for example electro-magnetic Braille displays. In certain disclosed embodiments, tactile displays may comprise capture plate assemblies. Such capture plate assemblies may be removable from tactile displays to facilitate cleaning and/or maintenance of the tactile display.

19 Claims, 13 Drawing Sheets

(56) References Cited

U.S. PATENT DOCUMENTS

| | | | |
|---|---|---|---|
| 2006/0166357 A1* | 7/2006 | Takayama | F16K 99/0048 |
| | | | 435/289.1 |
| 2009/0002328 A1 | 1/2009 | Ullrich et al. | |
| 2009/0023116 A1* | 1/2009 | Shaw | G09B 21/003 |
| | | | 434/114 |
| 2010/0233799 A1* | 9/2010 | Takayama | F16K 99/0001 |
| | | | 435/305.2 |
| 2013/0004922 A1* | 1/2013 | Takahashi | G09B 21/004 |
| | | | 434/113 |
| 2017/0076633 A1* | 3/2017 | Moon | G09B 21/004 |
| 2018/0342176 A1* | 11/2018 | Califorrniaa | G09B 21/004 |
| 2018/0366030 A1* | 12/2018 | Abebe | G06F 3/0219 |
| 2020/0294419 A1* | 9/2020 | Belomoev | H04W 4/80 |

FOREIGN PATENT DOCUMENTS

| | | | | |
|---|---|---|---|---|
| WO | WO-2015175193 A1 * | 11/2015 | | G09B 21/004 |
| WO | 2020106855 A1 | 5/2020 | | |
| WO | WO-2020106855 A1 * | 5/2020 | | G06F 3/016 |

* cited by examiner

CAPTURE PLATE ASSEMBLY FOR BRAILLE DISPLAY

CROSS REFERENCE TO RELATED APPLICATION

This application claims the benefit of U.S. Provisional Application No. 62/987,416 filed Mar. 10, 2020, which is hereby incorporated herein by reference in its entirety.

BACKGROUND

Several tactile displays have been developed and commercialized, but have various shortcomings. The most prevalent of these commercial tactile display devices use piezo electric actuators to move the tactile elements of the display. These piezo actuators are relatively expensive, fragile, slow to change states, require unsafe voltages to actuate, and are relatively large. The shortcomings of these tactile displays severely limit the number of moveable tactile elements that can be displayed on a device using the piezo technology. Additionally, current displays require maintenance in the form of annual cleaning of the display elements to maintain the functionality of the units. This cleaning is performed by technicians and is therefore time consuming and expensive. Therefore, there remains a need for improvement in the area of tactile displays.

SUMMARY

In one embodiment, the present disclosure pertains to tactile displays and adapters therefor that can be used to change the size of tactile elements observed by a user, shape of tactile elements observed by a user, location, such as relative location, of tactile elements, and/or other aspects of tactile elements of a tactile display. For example, in some embodiments, a Capture Plate Assembly (CPA) may be comprised of an array of pins or dots slidably located such that they can move independently up and down into a plurality of positions, including at least a bottom-most position (whereby a dot is "down") and a topmost position (whereby a dot is all the way "up").

In some embodiments, a CPA which is separate and/or removable from the actuators which move the dots may be utilized. In such embodiments, the CPA may be manufactured and assembled separately from the actuation modules or units.

In some embodiments, the CPA can be manufactured from plastic and/or passive electronic components only and incorporated into a tactile display, such that it can be removed and/or cleaned using a variety of techniques including a standard dishwasher. In some embodiments, a user of the device may be able to clean and/or maintain their own tactile display, and may also allow for easy removal to access actuation modules or elements, which can be inexpensively replaced as needed.

In other embodiments, a separate CPA may allow for variety in and/or modification of the arrangement of tactile dots as compared to the actuators. In some embodiments, the actuator elements can be spaced in a specific manner or format (often corresponding to the Braille standard, in which the spacing between tactile elements is not a regular pattern and/or not a regular array). Motion of actuator elements can be translated into the CPA using tactile dots that are spaced differently, sized differently, allow movement in clusters or separately to multiple latching heights, or otherwise designed to present a different experience to the end user than the standard Braille spacing of actuator elements or actuator modules themselves would allow.

In still other embodiments, a Capture Plate Assembly (CPA) can comprise a system for the user to interact with the display, and/or provide input, utilizing both a Capacitive Touch Subsystem (CTS) and/or a Dot Movement Detection Subsystem (DMDS).

Additional embodiments of the invention, as well as features and advantages thereof, will be apparent from the descriptions herein.

DETAILED DESCRIPTION

For the purposes of promoting an understanding of the principles of the invention, reference will now be made to certain embodiments and specific language will be used to describe the same. It will nevertheless be understood that no limitation of the scope of the invention is thereby intended, such alterations and further modifications, and such further applications of the principles of the invention as described herein being contemplated as would normally occur to one skilled in the art to which the invention relates. Additionally, in the detailed description below, numerous alternatives are given for various features. It will be understood that each such disclosed alternative, or combinations of such alternatives, can be combined with the more generalized features discussed in the Summary above, or set forth in the embodiments described below to provide additional disclosed embodiments herein.

Figure 1:
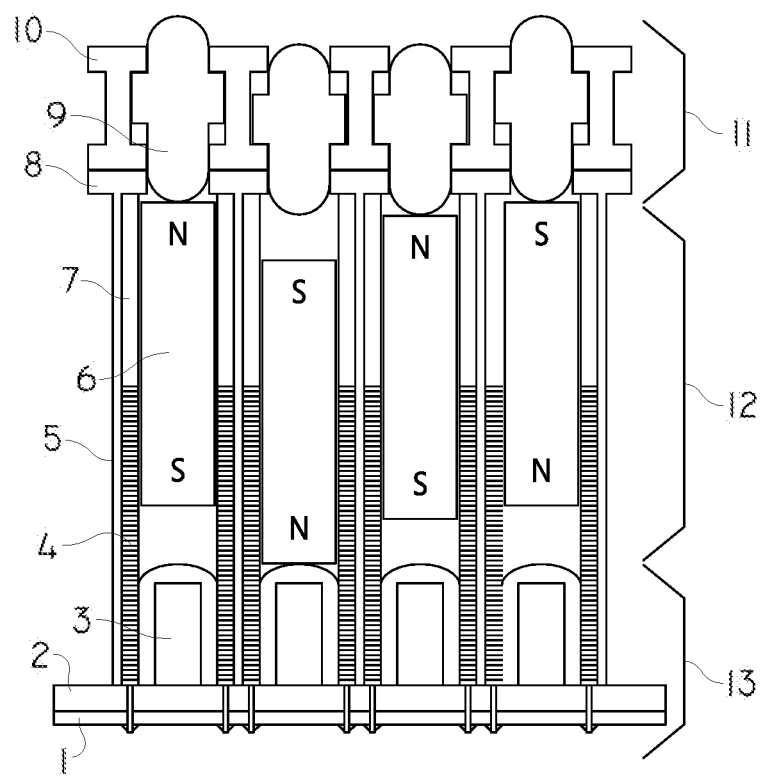
FIG. 1 shows a drawing of a side view of one embodiment of a tactile display such as a Braille display.

FIG. 1 shows a drawing of one embodiment of a tactile display, such as a braille display comprising a top assembly or CPA, middle assembly and a bottom assembly. In this embodiment, the bottom assembly comprises a circuit board (1), bottom insulator plate (2), and steel core or stator (3). In this embodiment, the metal assembly comprises wire core (4), steel honeycomb (5), magnet or actuator (6), and insulating spacer (7). Also, in this embodiment, the top assembly comprises a steel top plate or stator (8), braille dot (9), and insulator top plate (10).

In the embodiment of FIG. 1, the Top Assembly (11), otherwise known as the Capture Plate Assembly (CPA) is located above the actuation modules, which in this case are electromagnetic (although any type of actuation module would work the same way). Other assemblies in this embodiment include the middle assembly (12) and bottom assembly (13). The actuators, either directly or indirectly through mechanical linkage, push the CPA dots up when engaged, causing the dot to rise and be felt by the user. In the up position, the maximum clearance above the "deck" or top surface can be adjusted by changing the space between plates of the CPA (the height of the dot stroke). This allows different types of dots to be presented to the user based on differing Braille specifications or expectations worldwide.

Further, tolerance can be built into a CPA such that the dots in the up position do not normally fully contact the underside of the insulator top plate (10). This allows for some "slop" in tolerances that accumulate through the actuators, CPA, and dots to be eliminated by mechanical constraint of the dot stroke at the upward limit by the underside of the top plate (10).

In the down position, the dot may fall slightly below the top side of the top plate (10) such that the tip of the dot is even with or lower than this surface. Generally, allowing the dot in the down position to rest in a location anywhere from 0.000"-0.025" below the surface, with an optimal position of 0.002"-0.008" below the surface, is ideal to eliminate the possibility of "shadow" dots, or dots that can be felt even when in the down position.

Figure 2:
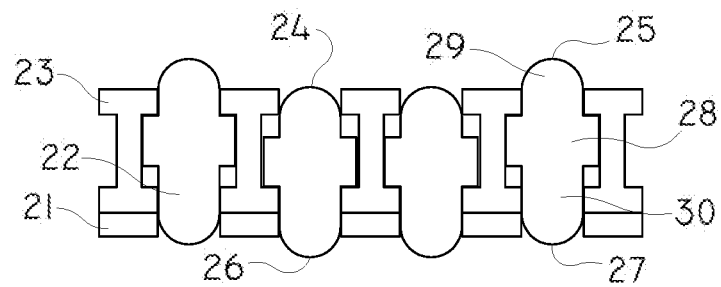
FIG. 2 shows a drawing of the side view of one embodiment of a CPA that may be used in tactile displays such as a Braille display.

FIG. 2 shows a drawing of one embodiment of a CPA. In this embodiment, the CPA comprises a top plate or stator (21), plastic dot (22), dot capture assembly (23), depressed pressed braille dot (24), raised Braille Dot (25), protruding linkage dot (26), retracted linkage dot (27), mechanical constraint collar (28), Braille dot (29), and linkage dot (30).

In the embodiment of FIG. 2, the Top Assembly may mechanically isolate the movement of the Braille dots from the actuation system, and/or may provide a user with a safe interface to interact with the Braille dots. Plastic dot 22 can be molded or machined as one or more pieces, for example, as three separate pieces comprising the mechanical constraint collar 28, the Braille dot 29, and the Linkage dot 30. In some embodiments, the dots can be assembled inside a dot capture assembly 23 which can be made in two or more pieces to allow for the dots to be placed into the assembly before sealing. In some embodiments, dot capture assembly 23 may be connected to and/or rest on the top plate 21, which may serve to electrically insulate the user from the actuation system in the event of a short.

The motion of the dot 22 can be mechanically isolated but directly influenced by the motion of the actuator. In some embodiments, the mechanical constraint collar 28 and the dot capture assembly 23 may be designed to have a geometry such that on the top side, a user can experience or observe a dot in the raised position as in 25 or in the depressed position 24. Generally speaking, and in certain embodiments, the distance in height between 24 and 25 positions may be kept to a minimum to reduce power consumption, although a larger stroke length is possible in some embodiments.

Further, in some embodiments, a user cannot depress the Braille dot 29 below the position of depressed braille dot 24 due to the geometry of the assembly, which prevents the user from accidentally actuating the magnet from the top latched position to the bottom latched position. Further, dot 29 can be prevented from raising too high or falling out of the display by the geometry of the assembly which, in some embodiments, may constrain the maximal height to the position of raised braille dot 25.

On the bottom side of the CPA of the embodiment of FIG. 2, linkage dot 30 may be in mechanical contact with a magnet actuator. In this embodiment, the lowest position of protruding linkage dot 26 the linkage dot 30 cannot push the actuator past the latching point; however, when the actuator is moved up from the bottom stator to the top stator it latches with sufficient force to move dot 22 into the raised position of raised Braille Dot 25 and holds it there with sufficient holding force for reading. In some embodiments, the raised position of retracted linkage dot 27 can provide a small air gap between the magnet actuator and the top plate 21. In certain embodiments, this gap can be adjusted to provide a certain preferred holding force.

In some preferred embodiments, entire top assembly can be removed from the rest of the tactile display. This removability may provide certain advantages, including, but not limited to removal for cleaning and/or maintenance. Heavy use of Braille displays tends to result in buildup of finger oil and dirt in small parts which cause performance issues. Therefore, a method of quick and easy cleaning may provide certain benefits.

The arrangement of dots in an array is of particular concern in regards to presenting Braille symbols and/or graphics to a user. Braille symbols follow a precise dot pattern composed of clusters of 6- or 8-dots in an irregularly spaced, but repeating array. This arrangement of dots, may prevent the use of regular spaced dots, for example such as in a square-packed array, from providing both graphics dots and Braille characters according to commonly used specifications. In some embodiments, tessellation patterns for the full array of dots may be used to present Braille dots and/or graphics to a user.

In some embodiments, visible and/or tactile features can be added to the outside of a capture plate assembly. When present, such features may allow a user to understand where a particular dot lies in the display and/or array of dots. In one embodiment, a "tick" mark may be used and may be placed along the top of a display and/or on the left side of a display. Other indicators that may be useful for identifying the location in a display or array include the use of colored dots. For example, in one embodiment, every fifth dot could be a different color. In one embodiment, white dots are used for normal dots, and a blue dot may be used as indicator dots. Such indicator dots may be placed a regular intervals in the display or array, or pattern in the display or array.

In other embodiments, a membrane can be used to physically separate the user's finger oils and dirt from the rest of the assembly.

In certain embodiments of the present disclosure, disclosed tactile displays can accommodate for the gradual buildup of finger debris, which can degrade performance and result in "sticky" dots that do not readily actuate.

For example, in some embodiments, tactile displays can incorporate a "cleaning mode". In certain of these embodiments, a cleaning mode may over-drive of the magnet actuators, energizing them with excess current beyond that typically needed for actuation, and further actuating the magnet many times in succession. When performed, this action mechanically forces some of the built-up debris to move up and out of the holes in the top Braille Capture plate, via mechanical conduction with the Braille Dot Pin. The debris can then be simply wiped off of the top surface of the tactile display.

In some embodiments, for more persistent debris, the entire Braille dot assembly can comprise a removable top for cleaning. Such a top may be physically separated from the actuation mechanism of the display by a thin membrane, which is preferably impermeable to debris. In such embodiments, the top half of the assembly may be removed and/or cleaned, and then re-assembled using alignment pins and clips. In some embodiments, cleaning a tactile display of the present disclosure by removing the top can be performed on the time scale of minutes, for example, in one minute, in greater than one minute, in two minutes, in greater than two minutes, between one minute and five minutes, and/or in greater than five minutes.

Figure 3:
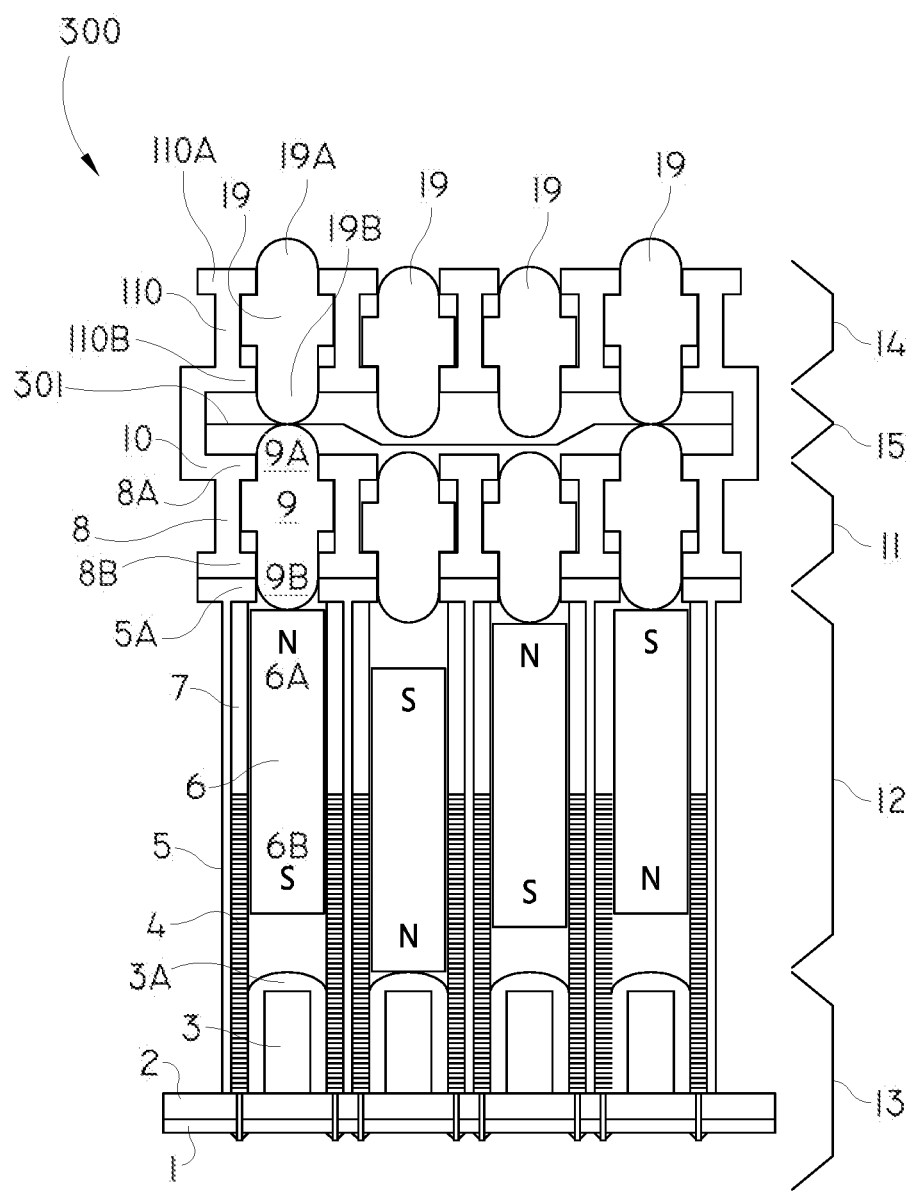
FIG. 3 shows a drawing of a side view of one embodiment of a tactile display such as a Braille display comprising a membrane.

FIG. 3 shows a drawing of a side view of one embodiment of a tactile display such as a Braille display (300) comprising a membrane (301), bottom assembly 13, middle assembly 12, top assembly 11, membrane assembly 15, and capture plate assembly 14. Also shown in this embodiment is circuit board 1, bottom insulator plate 2, steel core or stator 3, plastic stator cover 3A, wire core 4, steel honeycomb 5, constraint collar 5A, magnet or actuator 6 with north pole 6A and south pole 6B, insulating spacer 7, top plate or stator 8 with constraint collar 8A and constraint collar 8B, insulator top plate 10, braille dot 9 with dot portion 9A and dot portion 9B, dot capture assembly 110, dot capture assembly collar 110A, dot capture assembly collar 110B, display dots 19, display dot portion 19A, and display dot portion 19B.

Figure 4:
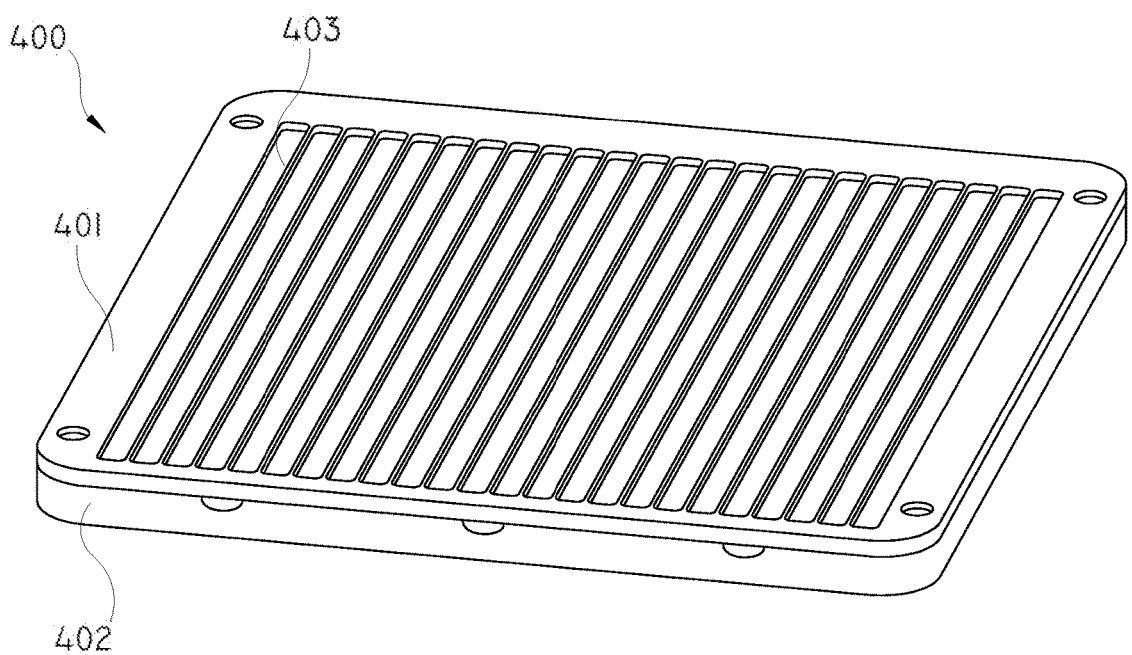
FIG. 4 shows a drawing of one embodiment of a fully assembled CPA with a top plate and a bottom plate.

FIG. 4 shows a drawing of one embodiment of a fully assembled CPA (400) with a top plate (401) and a bottom plate (402). In the embodiment of FIG. 4, this embodiment comprises a fully assembled CPA, with both a top plate (401) defining a structural rib (403) and a bottom plate (402).

Figure 5:
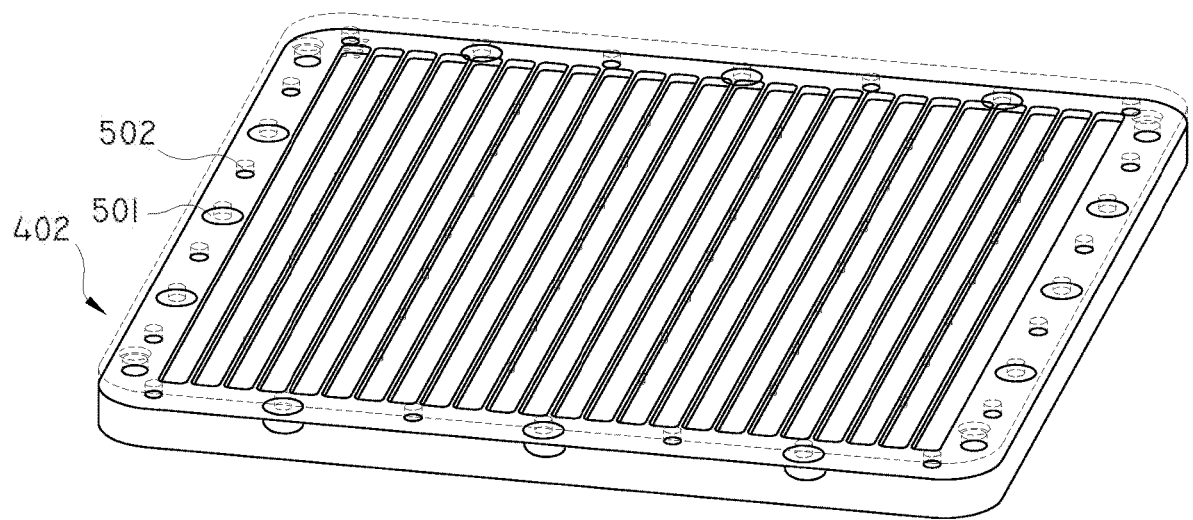
FIG. 5 shows a drawing of one embodiment of a bottom plate of a CPA.

The drawing of FIG. 5 shows a one embodiment of bottom plate 402 forming openings 501 and 502 where a top plate may be situated.

Figure 6:
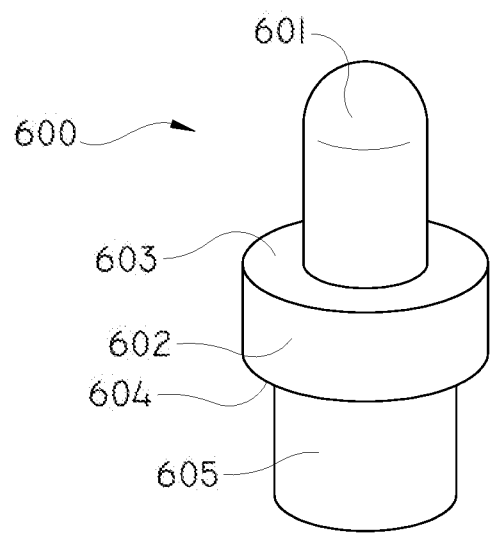
FIG. 6 shows a drawing of one embodiment of a Braille dot as it rests between a top place of a CPA and a bottom plate of a CPA.

FIG. 6 shows a drawing of a Braille dot 600 suitable for use in embodiments of the present disclosure. The bottom shaft 605 of the Braille dot shown in FIG. 6 comprises a different diameter than the top shaft 601. Also shown is collar 602 with shoulder 603 and shoulder 604. In other embodiments, the shaft or shafts of a Braille dot can be non-concentric, such that asymmetrical dots can be used. When non-concentric dots are used, they may be useful for altering the spacing of dots presented to a user, for example, but not limited to converting the actuator spacing into a different style of spacing such as regular—square closest packed or hexagonal closest packed.

Figure 7:
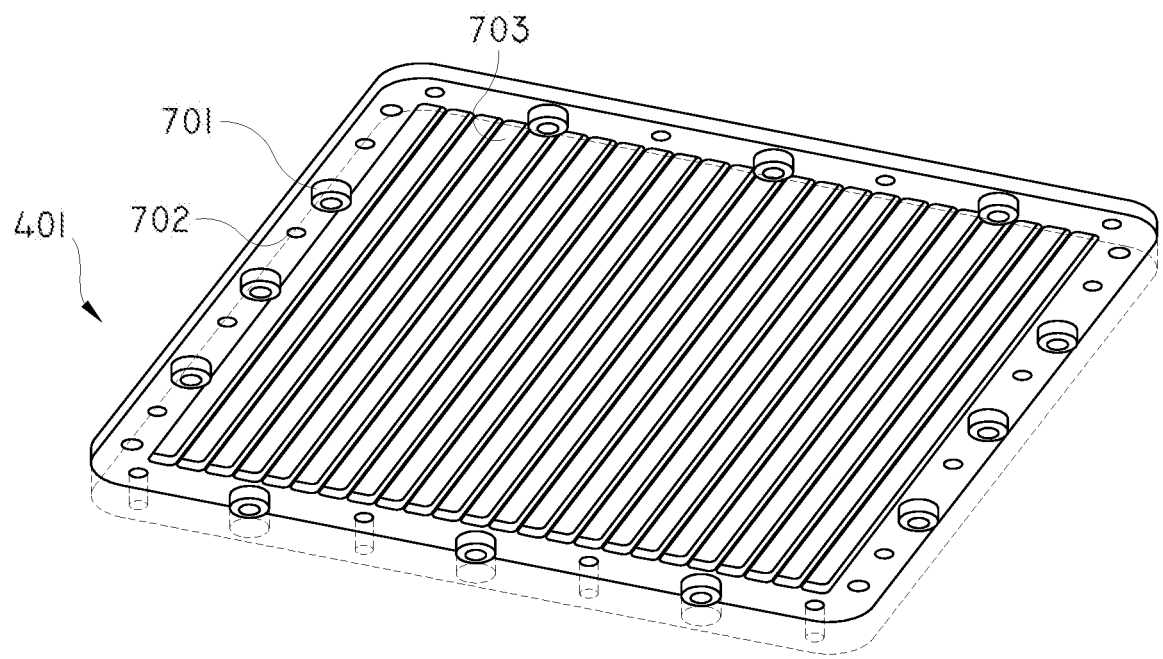
FIG. 7 shows a drawing of one embodiment of a top plate of a CPA.

FIG. 7 shows a drawing of one embodiment of a top plate 401 of a CPA. FIG. 7 shows a view of the underside of the top plate of a CPA. In this embodiment, alignment posts 702 and 701 for mating the two plates of the CPA may be used. Also in this embodiment, there are openings defining a space for physically forcing two plates of a CPA together to prevent bowing. Additionally, in this embodiment and other embodiments, ridges or structural ribs 703 between spaces for Braille holes may be utilized to prevent bowing of the plates.

Figure 8:
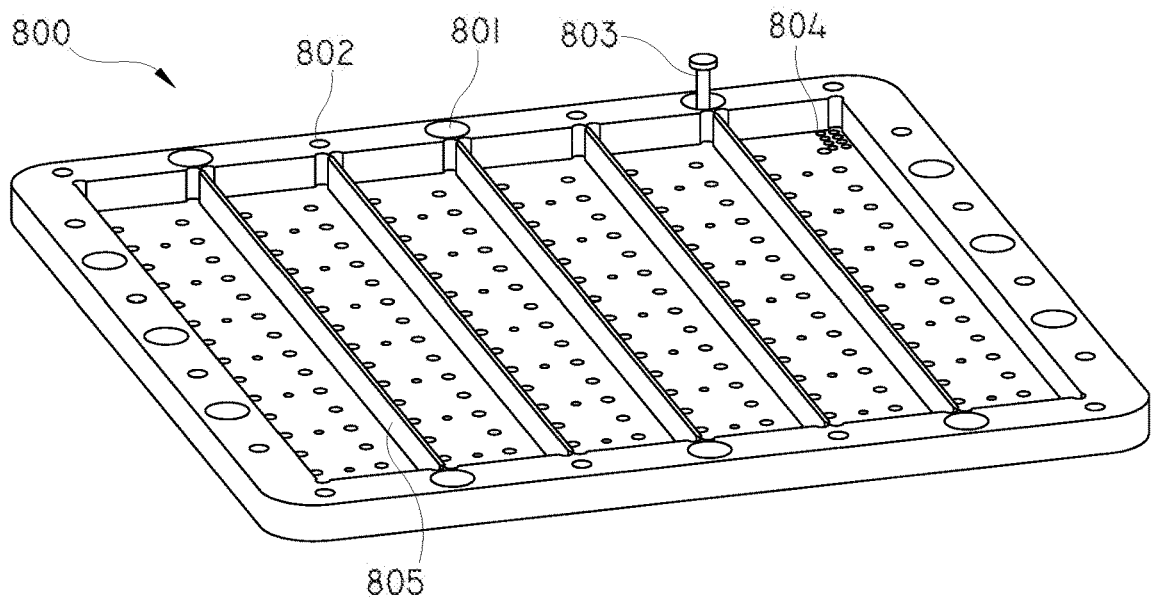
FIG. 8 shows a drawing of one embodiment of a top plate of a CPA.

FIG. 8 shows a drawing of one embodiment of a top plate 800 of a CPA. FIG. 8 shows a view of the underside of the top plate of a CPA. In this embodiment, screws 803 may be used for the assembly. Additionally in this embodiment the top plate forms openings 801 and 802 where posts may be used to align or seat the bottom plate as well as openings 804 which may be used for dots to protrude or pass through. Also shown in this embodiment are ridges or structural ribs 805.

Figure 9:
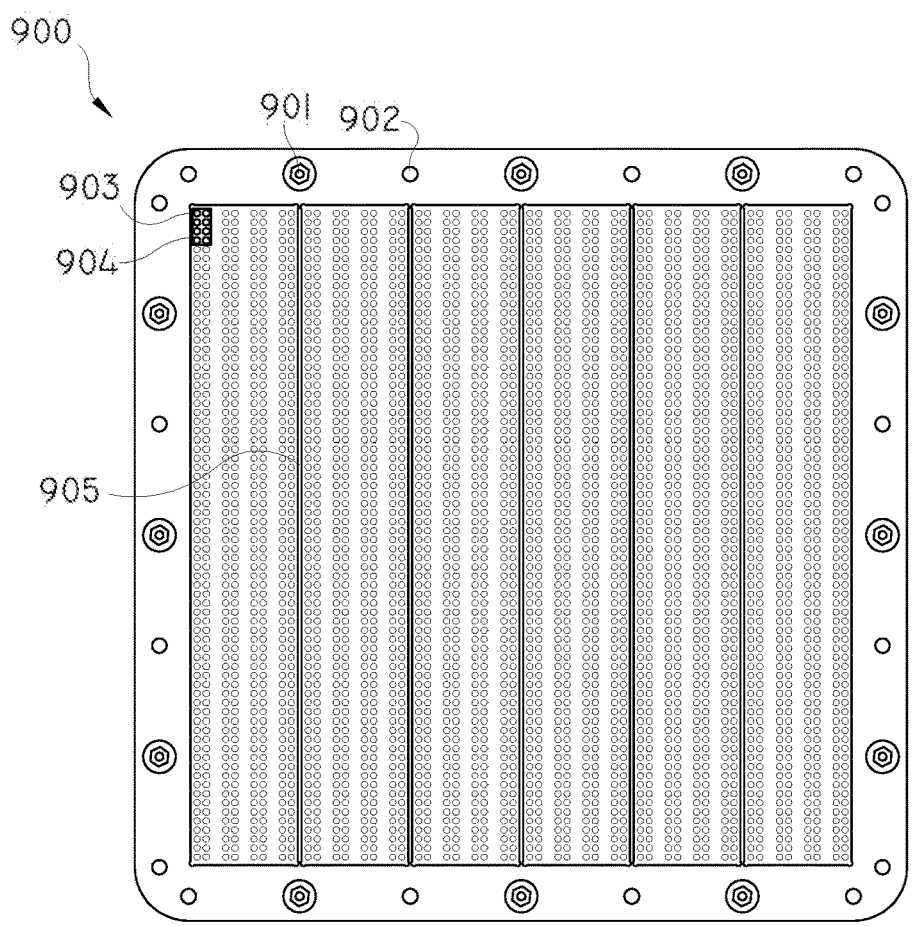
FIG. 9 shows a drawing of one embodiment of a fully assembled CPA with 3,072 Braille dots loaded to represent an array comprising 16 lines of 8-dot Braille characters with 24 Braille characters per line.

FIG. 9 shows a drawing of one embodiment of a fully assembled CPA 900 with 3,072 Braille dots loaded to represent an array comprising 16 lines of 8-dot Braille characters with 24 Braille characters per line. FIG. 9 shows a view of the underside of one embodiment of a disclosed CPA as it stands fully assembled, with 3,072 Braille dots loaded to represent an array of 16 lines of 8-dot Braille characters (24 characters per line). Braille cell 904 form parts of this array with Braille dot 903. Also shown in this embodiment are opening 901 and 902 as well as ridge or structural rib 905.

Figure 10:
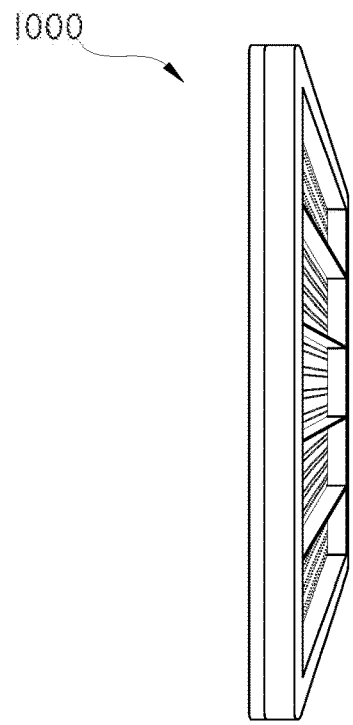
FIG. 10 shows a drawing of one embodiment of a fully assembled CPA.

FIG. 10 shows a drawing of one embodiment of a fully assembled CPA 1000. FIG. 10 shows a side view of one embodiment of the presently-disclosed CPA fully assembled. In this embodiment, the two plates fit together tightly and there is relatively little bowing in the CPA when used.

Figure 11:
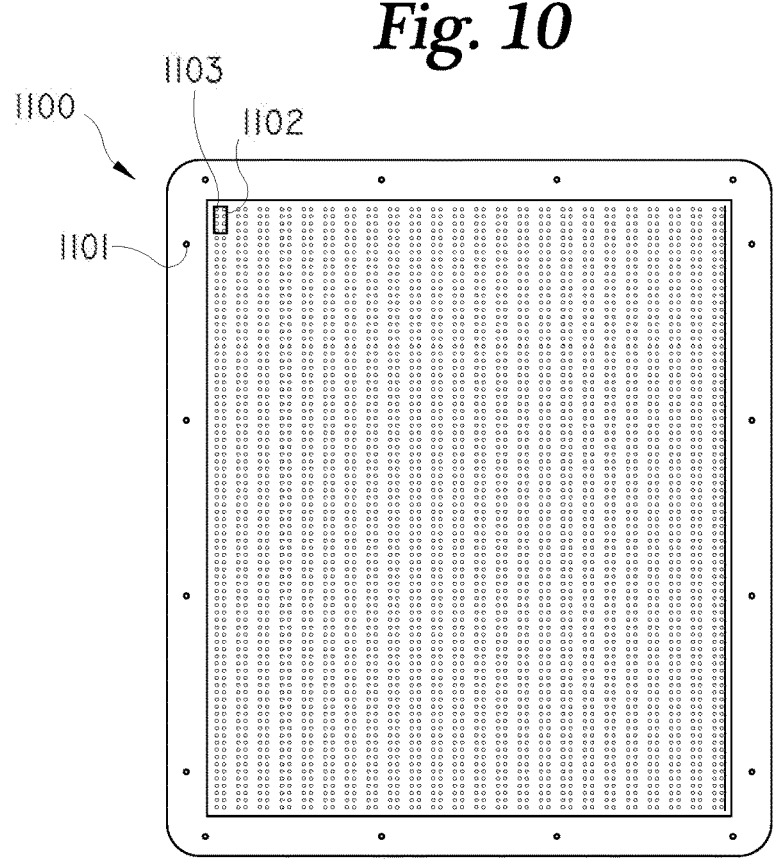
FIG. 11 shows a drawing of one embodiment of a fully assembled CPA.

FIG. 11 shows a drawing of a top view of one embodiment of a CPA 1100 fully assembled. In this embodiment Braille cell 1102 with braille dot 1103 form part of the array of tactile elements and the capture plate assembly forms voids 1101 for alignment with other parts or accessories.

In other embodiments, the CPA may have one or more surfaces defining a hole for a graphics adapter or other adapter that will further translate the motion of the actuators into a different style, pattern, spacing, or type of dot without having to disassemble anything. When used, an adapter can simply be placed on top of the existing CPA, and/or on top of tactile elements themselves.

In some embodiments, each Braille dot may be captured between plates that are independent of actuator modules or actuator elements. When captured between plates, assembly of the CPA may be performed manually, using robotic, and/or automated loading of dots.

In still other embodiments, a dot may have a flange larger than a top hole and/or a bottom hole which allow the dot to be captured between plates while still remaining movable within the confines of a top plate and/or a bottom plate. In such embodiments, the dot may be of a variable size and/or different size on both shafts of the dot to allow for various actuators and/or braille dots to be presented to a user. Further, in such embodiments, the size of each shaft can be different, and either concentric or non-concentric.

In some embodiments, the bottom plate may comprise features and/or elements to ensure positive alignment of actuator modules within plate. In such embodiments, the actuator modules may have features to connect to the alignment features of the CPA and/or the Braille dots may be concave on the bottom side to allow for smooth mating with the actuator surface (typically a pin). In other embodiments, the bottom of the dot feature can be convex, concave, or other shapes to allow for mating, locking, and/or sliding against the actuator surface as needed. For example, in some embodiments, the size of an actuator may be smaller than the size of the dot shaft, and/or chamfers may be used to allow for some alignment and/or misalignment of dots and actuators to self-center during assembly. In some embodiments, the top surface of the actuator may be mechanically in contact with the underside of a CPA. When the top surface of an actuator is in mechanical contact with the underside of a CPA, this may allow for changing the dimensions of the CPA to control tolerance issues, dot travel, and/or dot height.

In some embodiments, the CPA plates may have ribs on a bottom plate to allow for structural strength to prevent bending or bowing.

In certain embodiments, CPA plates may have multiple sizes and locations of fasteners to attach top and bottom plate to provide stacked layer. In preferred embodiments, when fasteners are utilized, they are not visible to a user.

In some embodiments, the top plate of a CPA may comprise ribbing for structure to provide strength and/or spaces for dots.

In still other embodiments, foam and/or another other sound dampening materials for noise reduction, to control tolerance, or to provide standoff from mating surfaces may be used. For example, in some embodiments, sound-absorbent material may be placed inside the frame of the capture plate. In such embodiments, the flange of the dot may impact the sound-absorbent material upon actuation rather than on other materials, which may dampen vibrations produced. Sound dampening materials may include, but are not limited to, foam, rubber, soft-touch coatings (e.g., coatings such as those used on phones and/or remote controls), glue, and/or glue microdots. A glue jet printer may be used to place microdots of foam, plastic, adhesive, or other materials upon a substrate in some embodiments, for example around a dot hole. Spaced dots such as spaced microdots may reduce suction, adhesion, and/or friction resulting from the flange of a dot's impact on sound-absorbing material.

In certain embodiments, a CPA may comprise alignment posts for assembly of top and bottom plate. When used, such plates can be disassembled without disturbing dots and may allow for deep cleaning or dot replacement without an extensive re-assembly.

In some embodiments, CPA plates may be produced with concave bowing (from top perceptive) so that the assembly is lowest in the middle and highest at the ends. This can be done with molding or milling techniques. This ensures that the assembly will be level when fastened down on the ends. Bowing of the CPA is a crucial issue as it can cause dots in the middle to fail to raise above the deck when in the upmost position. In some embodiments, interstitial fasteners may be used to further ensure that the assembly does not bow.

In some preferred embodiments, the CPA minimizes friction between parts so that dots can fall freely with gravity but also do not resist motion of actuator to raise them.

In preferred embodiments, actuators are kept independent, separated, and/or separable from dots to allow for cleaning and maintenance.

In some embodiments, the bottom of a dot may be concave to the mating surface of the actuator so that the actuator self-centers on the dot when pushing. (Actuator stems can be smaller than the dot bottom shaft diameter).

In certain embodiments, dots may rotate and/or latch at multiple heights (in a fashion similar to the mechanism of a ball point, clicking ink pen). Further, dots can be organized to work in groups to latch at multiple heights; for example, a group of 4 dots can be used to raise a specially shaped dot to 3 different latched positions (or fully down for the $4^{th}$ position).

In some embodiments, a CPA may comprise a touch-sensitive surface. In preferred embodiments, a CPA comprising a touch-sensitive is comprised of only passive electronics. However, in other embodiments, active components, and/or a mixture of active and passive components may comprise a touch-sensitive surface of a CPA. When used, a touch surface can be attached to the top or bottom of the top CPA plate, it can be sandwiched inside the top CPA plate, or it can be insert molded into the top CPA plate. When capacitive touch sensitivity is utilized, only passive wires are needed for the touch sensitivity, which can be further connected to the rest of the Braille display electronics in a variety of ways: either by direct physical contact on pads, by a wire or cable, by magnetic latch, or by induction.

In certain embodiments, if the top plate of a CPA is made of a Printed Circuit Board (PCB) with regularly spaced holes drilled though it, the traces on the PCB may be used as a touch display. When utilized, such a touch display allows the users to take advantage of touch-sensitive features such as cursor routing, gestural controls, and even drawing mode.

Capacitive sensing is a technology, based on capacitive coupling, that can detect and measure anything that is conductive or has a dielectric different from air. Human interface devices based on capacitive sensing, such as digital audio players, mobile phones, and tablet computers use capacitive sensing touchscreens as input devices.

Projected capacitive touch (PCT) technology is a capacitive technology which allows more accurate and flexible operation, by etching a conductive layer. An X-Y grid may be formed either by etching one layer to form a grid pattern of electrodes, or by etching two separate, parallel layers of conductive material with perpendicular lines or tracks to form the grid; comparable to the pixel grid found in many liquid crystal displays (LCD).

PCT, may allow for a higher resolution, and/or allow for operation with no direct contact, such that the conducting layers can be coated with further protective insulating layers, and operate even under screen protectors, or behind weather and vandal-proof glass.

Mutual capacitive sensors have a capacitor at each intersection of each row and each column. In one embodiment, a 32by-16 array, or one sensor per cell of the refreshable Braille display, would have 512 independent capacitors. If each dot in the refreshable Braille display was sensed, then one would need 4,096 capacitors; however, in practice this is not always needed. Instead, interpolation techniques can be used by measuring the intensity of activation of neighboring cells and using an algorithm to determine exact finger position.

When capacitive sensors are used, a voltage may be applied to the rows and/or columns. Bringing a finger or conductive stylus near the surface of the sensor changes the local electric field which reduces the mutual capacitance. The capacitance change at individual points, for example but not limited to each point, on the grid can be measured to accurately determine the touch location by measuring the voltage in the other axis. Mutual capacitance allows multi-touch operation where multiple fingers, palms or styli can be accurately tracked at the same time. Mutual capacitance and/or multi-touch may have certain benefits when used on a refreshable Braille display, because, for example, as multiple fingers may be in contact with the display while reading.

Figure 12:
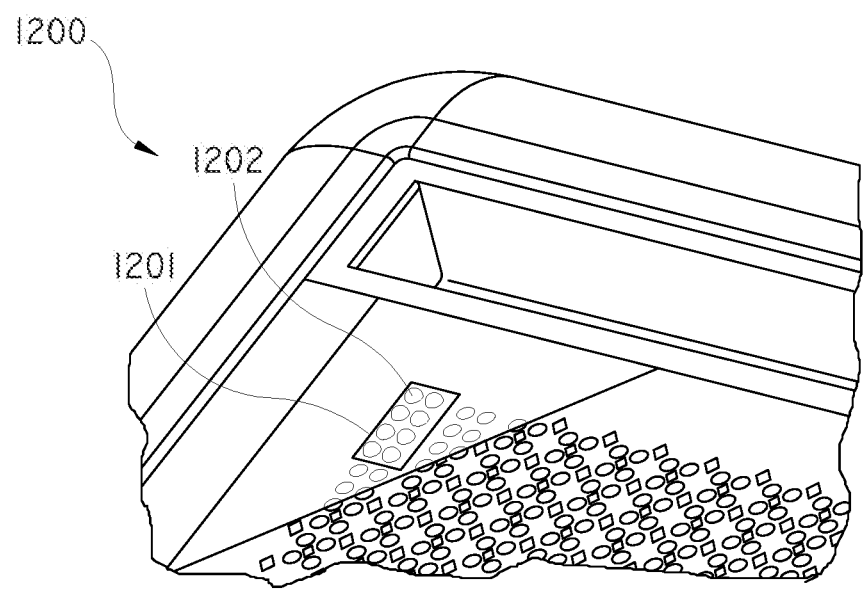
FIG. 12 shows a drawing of one embodiment of the present disclosure, wherein a PCB is used as a top plate of a CPA to allow for a touch sensitivity feature.

FIG. 12 shows a drawing of one embodiment of the present disclosure, wherein a PCB is used as a top plate of a CPA 1200 to allow for a touch sensitivity feature. Also shown in this drawing is Braille cell 1201 with Braille dots 1202.

In some embodiments, the CTS may be composed in an alternative manner than by use of a PCB. For example, alternatively and/or in combination with a PCB, a CTS can be produced as matrix of thin metal strips inside either the top place of the CPA, the bottom plate of the CPA, or some combination thereof. When used, embedded or adhered metal strips may allow for the CPA can be made entirely of passive electronics and dishwasher safe.

In one embodiment, the control circuitry needed for handling the signals from the CTS can be collocated inside or on the CPA.

In another embodiment, the CPA with embedded CTS strips can be connected to an external circuit board, located elsewhere in the refreshable braille display, so that the resultant signals—small changes in voltage or current—can be analyzed and processed. These signals can be communicated from the wires of the CTS to the external circuit board via a variety of connection methods: direct pressure contacts, standard connectors or cables, magnetic connectors, or by induction (via close physical proximity) only.

Figure 13:
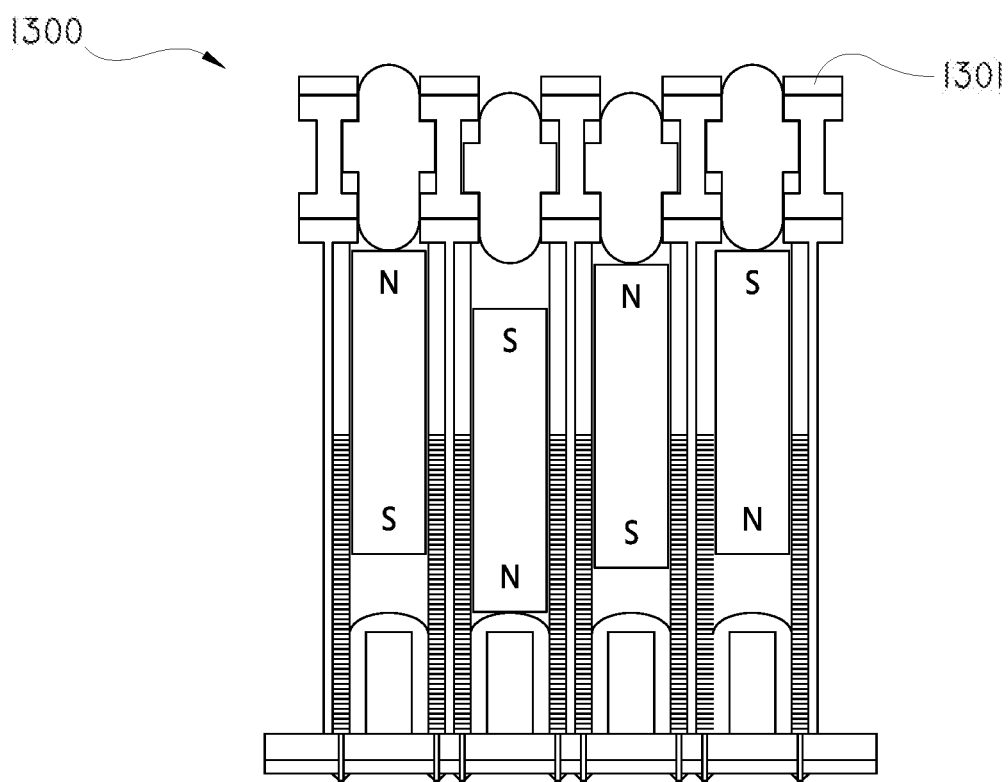
FIG. 13 shows a drawing of one embodiment of a CTS comprising an array of thin metal strips or wires located inside or near the CPA.

FIG. 13 shows one embodiment of a CTS comprising an array of thin metal strips or wires 1301 located inside or near the CPA 1300. In this embodiment, the CTS strips or wires run in one direction (left to right, or alternatively top-to-bottom) and are located on the top of the CPA, either held together mechanically by fasteners or features of the CPA and display, or with adhesives. The left-to-right strips run between rows of dots such that each strip is continuous across the width (or length) of the display.

Figure 14:
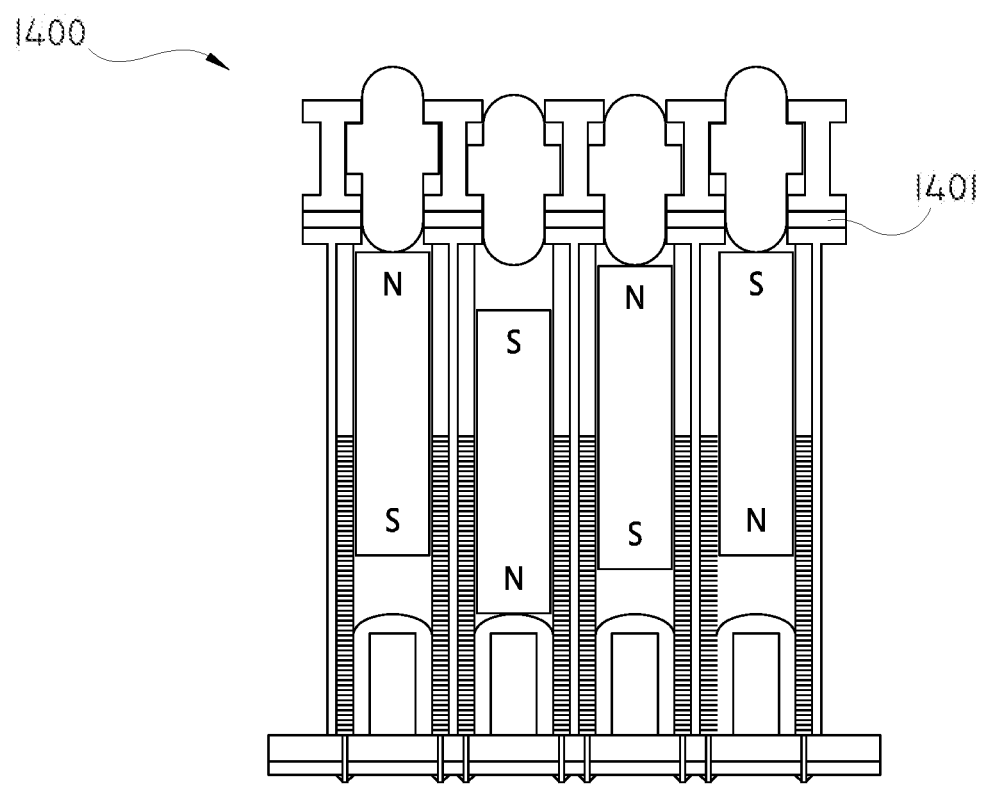
FIG. 14 shows a drawing of one embodiment of a CTS system located on the bottom of a CPA.

FIG. 14 shows an embodiment of a CTS system located on the bottom of a CPA 1400. In the embodiment of FIG. 14, CTS strips or wires 1401 run in one direction (left to right, or alternatively top-to-bottom) and are located on the bottom of the CPA, either held together mechanically by fasteners or features of the CPA and display, or with adhesives. The left-to-right strips run between rows of dots such that each strip is continuous across the width (or length) of the display.

Figure 15:
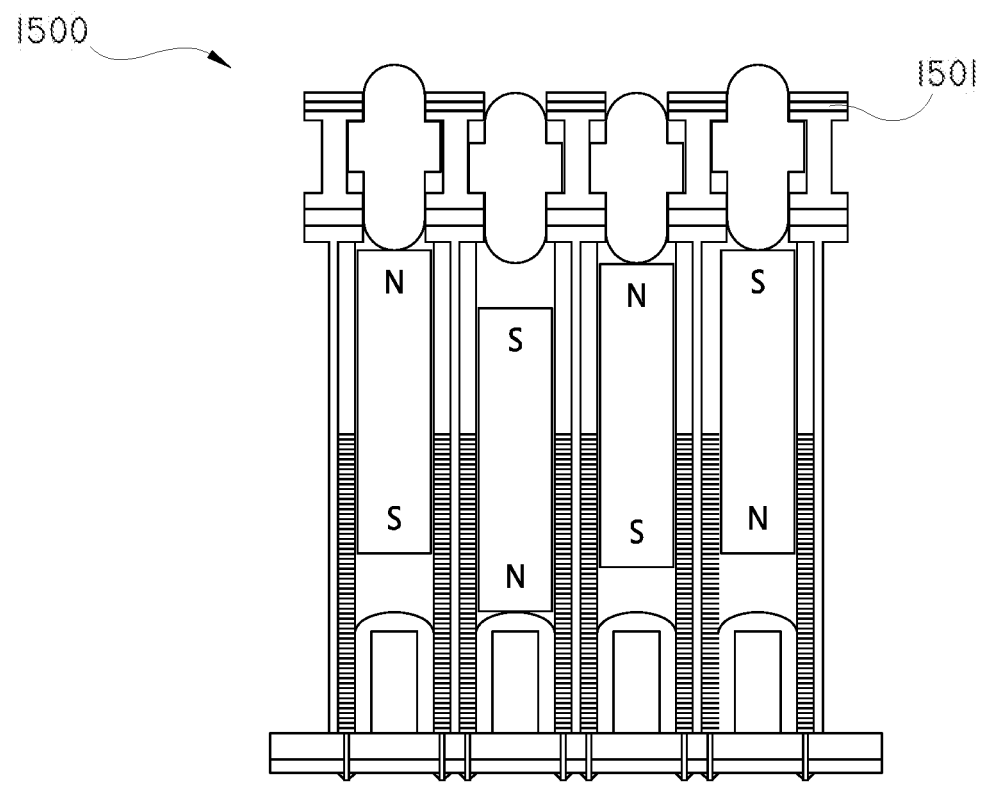
FIG. 15 shows a drawing of one embodiment of a CTS touch layer embedded into a CPA.

FIG. 15 shows one embodiment of a CTS touch layer embedded into a CPA 1500.

In the embodiment of FIG. 15, CTS strips or wires 1501 run in one direction (left to right, or alternatively top-to-bottom) and are located embedded into the top of the CPA. This embedding can be done by layering plastic parts of the top plate of the CPA with metal strips sandwiched in between, held together by fasteners or adhesives. Alternatively, this can be accomplished by insert molding, whereby the metal strips are inserted into the injection mold and molded with the plastic plate all as one part. The left-to-right strips run between rows of dots such that each strip is continuous across the width (or length) of the display.

Figure 16:
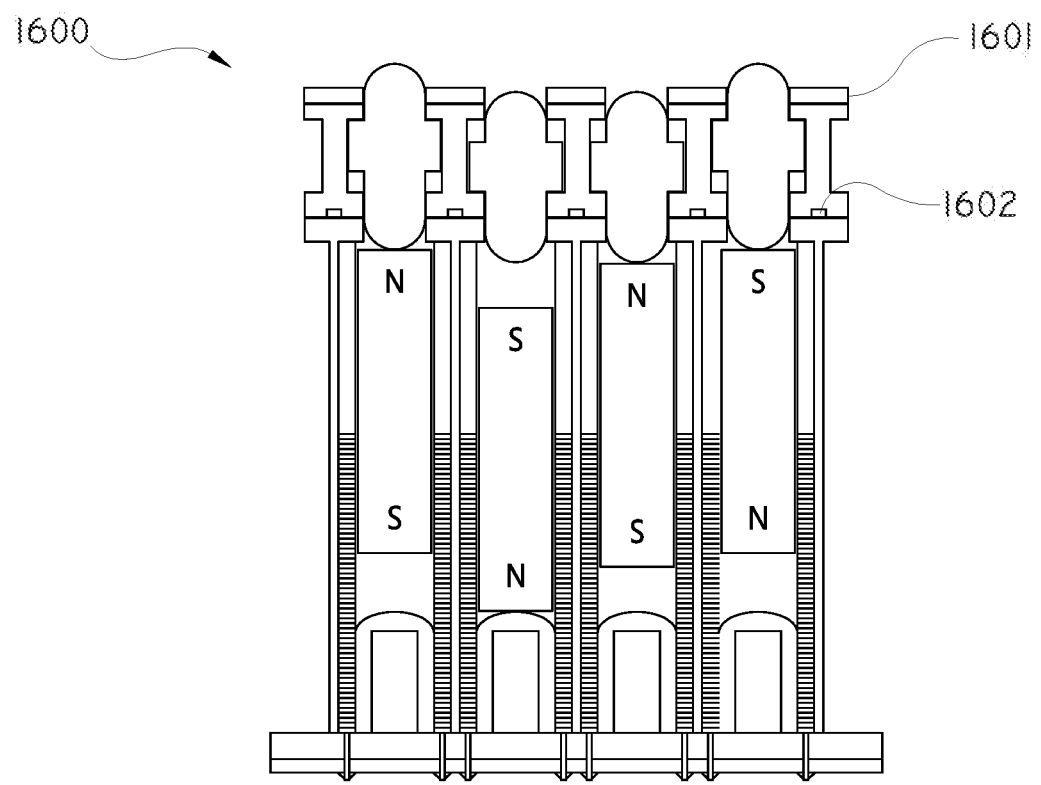
FIG. 16 shows a side view drawing of one embodiment of a tactile display comprising a capacitive touch later located at the top and bottom of a CPA.

FIG. 16 shows a side view of one embodiment of a tactile display comprising a capacitive touch later located at the top and bottom of a CPA 1600. In the embodiment of FIG. 16, CTS strips or wires 1601 and 1602 run in two directions forming an X-Y matrix (left to right, and in-and-out of the page) and are located both on top of the top plate and below the bottom plate of CPA. The CTS strips are either held in place mechanically by fasteners or features of the CPA and display, or with adhesives. The left-to-right strips run between rows (or columns) of dots such that each strip is continuous across the width (or length) of the display. The in-and-out dots also run between rows (or columns) of dots such that each strip is continuous across the width (or length) of the display, but opposite the left-to-right strips. Hence, one set runs perpendicular to the other set in the plane, such that an X-Y matrix is formed, but at no time to the strips of the X array touch the strips of the Y array as both are separated vertically and by insulating plastic of the CPA.

Figure 17:
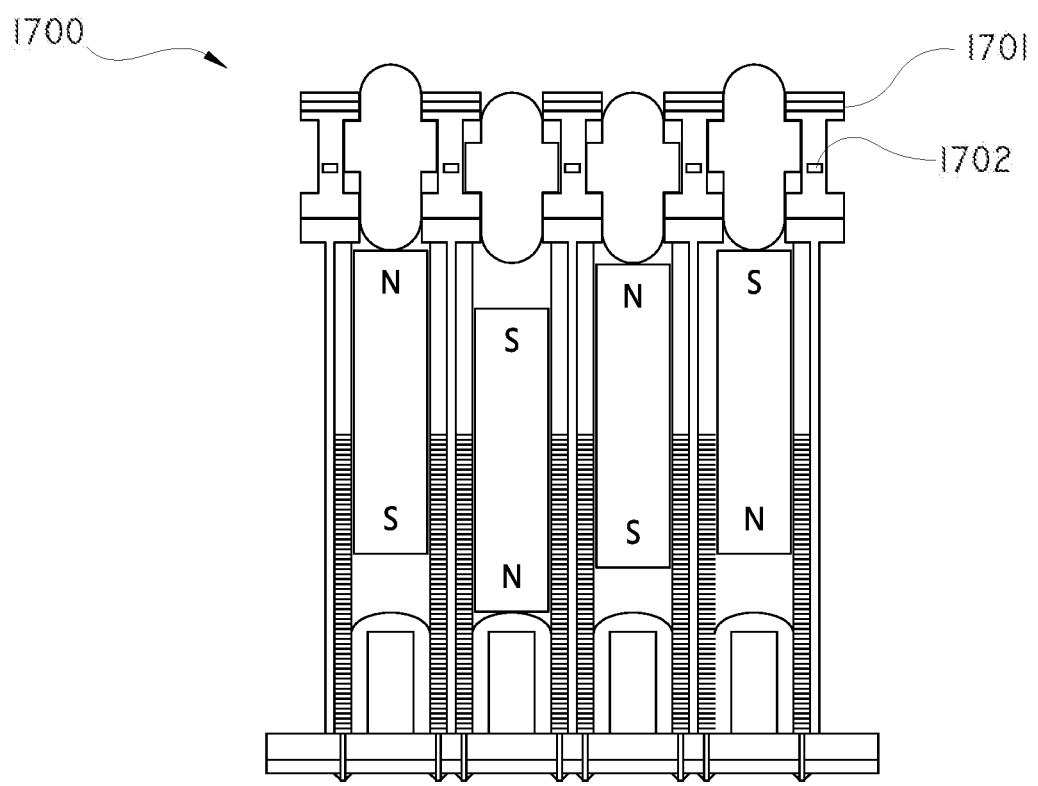
FIG. 17 shows a side view drawing of one embodiment of a tactile display comprising an X-Y capacitive touch layer embedded into the CPA.

FIG. 17 shows a side view of one embodiment of a tactile display comprising an X-Y capacitive touch layer embedded into the CPA 1700. In the embodiment of FIG. 17, CTS strips or wires 1701 and 1702 run in two directions forming an X-Y matrix (left to right, and in-and-out of the page) and may be located by both embedded inside the top plate and being embedded inside the bottom plate of CPA. Embedding can be done by layering plastic parts of the top plate of the CPA with metal strips sandwiched in between, held together by fasteners or adhesives. Alternatively, embedding can be accomplished by insert molding, whereby the metal strips are inserted into the injection mold and molded with the plastic plate all as one part. The left-to-right strips run between rows (or columns) of dots such that each strip is continuous across the width (or length) of the display. The in-and-out dots also run between rows (or columns) of dots such that each strip is continuous across the width (or length) of the display, but opposite the left-to-right strips. Hence, one set runs perpendicular to the other set in the plane, such that an X-Y matrix is formed, but at no time to the strips of the X array touch the strips of the Y array as both are separated vertically and by insulating plastic of the CPA.

In still other embodiments, CTS can instead be created utilizing a thin-film covering over the CPA, with holes in the film corresponding to the holes in the CPA top plate. This thin-film layer can be surrounded with electrodes on the perimeter of the CPA and the presence of fingers detected using Electric Field Tomography (EFT).

Figure 18:
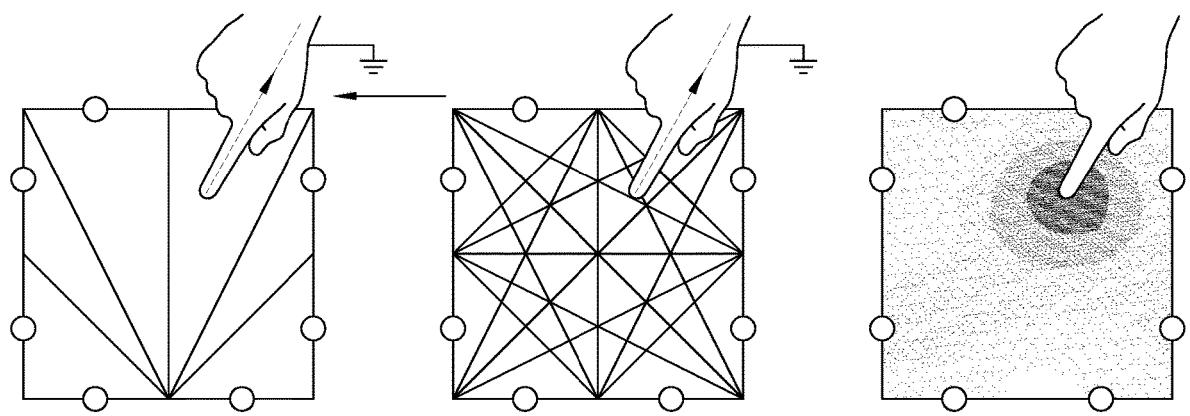
FIG. 18 shows a drawing of one embodiment of how electric field tomography (EFT) may be used to locate a touch on a surface.

In EFT, a series of electrodes around the interface surface pass a small amount of electric current into the conductive layer. Voltage is then measured at all of adjacent electrodes. When a finger touches the surface, some current is shunted, causing a reduction of voltage at the contact point. Cross-sectional measurements around the surface are taken, and using electric field tomography, the exact location of the touch can then be calculated. FIG. 18 shows one embodiment of how electric field tomography (EFT) may be used to locate a touch on a surface.

When used in the CTS, a touch interface surface film may be applied as a spray-on layer, as an adhesive layer, or as a molded part of the material of the top plate of the CPA. Holes would may be integrated as the film is applied (e. g. cut into an adhesive-backed material using a die cut and applied) or cut after application by cutting with a die directly through the existing holes in the CPA top plate. In the case of the spray on approach, the holes in the CPA top plate would first be masked using removable rods.

For example, in some embodiments, after a thin film layer is applied, electrodes may be connected around the perimeter of the film, on the edge of the CPA. These electrodes do not interfere with the CPA or the actuation modules, and may be integrated into the display. The connection between the thin film and the electrodes can be by direct physical pressure, soldered joints, connectors or cables, magnetic connectors, or by induction.

Once electrodes are connected, a tomography map is created by measuring voltages across all combinations of electrodes as a small test current is applied. Alternatively, similar mapping can be done by measuring resistances, induced currents, or induced voltages.

After the baseline tomography map is created, differences in the map voltage, resistance, current, etc. can be detected when finger touch is applied to the thin film surface. These slight differences can be analyzed using computer software and calibrated to determine where the finger touch is located on the surface.

With the use of a touch-sensitive top surface, the refreshable Braille display can be controlled using gestures by the user. This may eliminate, or help to alleviate, a major user interface issue—with a large display full of dots—where to place the controls. In one embodiment, the refreshable Braille display includes some controls along the bezel of the display; however, more precise controls are needed.

When used, a refreshable Braille display can take advantage of gesture commands such as the following examples:
  Swipe right (one finger) to scroll an individual line of text.
  Swipe right or left (multiple fingers) to go forward or back one page of text.
  Swipe up or down to scroll the display up or down.
  Double-tap a finger on a cell to route the cursor to that cell.
  Hold or toggle a control button and move a finger on the display to "draw"—raise dots along the path of the finger.

In some embodiments of the present disclosure, actuation mechanism or mechanisms may also provide a method to detect the depression of a dot by a finger. When utilized, this system may be called a Dot Movement Detection Subsystem (DMDS).

In certain embodiments, a Dot Assembly is connected mechanically to the magnet itself, via the shaft of the Dot Pin Assembly. This means that when the user presses on a dot, such as by reading it, the magnet is also depressed, or moves within a coil. The motion of a magnet through the coil will induce a small eddy current in the coil itself. Eddy currents are loops of electrical current induced within conductors by a changing magnetic field in the conductor. Eddy currents flow in closed loops within conductors, in planes perpendicular to the magnetic field. The magnitude of the current in a given loop is proportional to the strength of the magnetic field, the area of the loop, and the rate of change of flux, and inversely proportional to the resistivity of the material. This eddy current can in turn be measured and used as a detection mechanism for dot depression. One method that can be used is an eddy current array (ECA). ECA technology provides the ability to electronically drive an array of coils (multiple coils) arranged in specific pattern called a topology that generates a sensitivity profile suited to the target. Data acquisition is achieved by multiplexing the coils in a special pattern to avoid mutual inductance between the individual coils.

The utility of the DMDS can be further enhanced by the use of magnetic dots, as opposed to the traditional plastic dots. Traditionally, actuators are comprised of strong rare-earth permanent magnets. When magnetic dots are used, the dots (the elements which are presented to the user for touch through the top plate of the CPA) themselves are also magnetic. This can be accomplished in several ways. The dots can be custom-molded from similar rare earth permanent magnetic material, although this process is expensive. Alternatively, the dots can be injection molded using traditional means but with a "doped" plastic slurry with a Ferrous content ranging from 5%-50%. This doping can make the part harder to injection mold with high precision, and care must be made to avoid demagnetizing the part by exceeding the Curie temperature of the doping agent.

Figure 19:
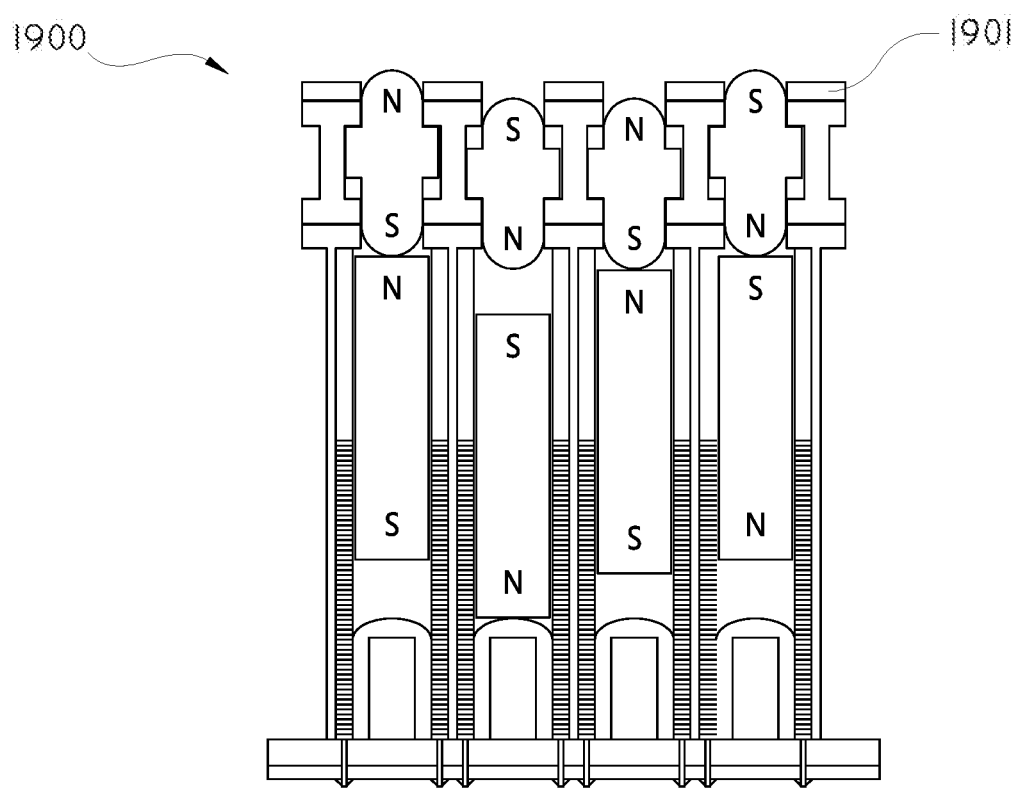
FIG. 19 shows a drawing of one embodiment where magnetic dots are used in a CPA.

FIG. 19 shows a drawing of one embodiment where magnetic dots are used in a CPA 1900 and thin metal strips or wires 1901.

In one embodiment, the dot is not inherently magnetic, but has enough Ferrous content to react and adhere to the magnet actuator when mechanically close to the actuator. In practice, this results in the dot "sticking: to the actuator in both the up stroke and the down stroke. This has the advantage of providing a downward pulling force on the down stroke of the actuator on the dot, as opposed to relying on gravity alone to drop the dot. Since the weight of the dot is small, the magnetic force is many times stronger, and this downward pull will help to overcome mechanical friction in the CPA system, and debris or residue that may be blocking dot motion. It also provides a better mechanical means for ensuring positive feedback that the dot physically actuated when the actuator has changed state.

In another embodiment, the dot can be itself as strongly magnetic as the actuator, and stick tightly together.

In some embodiments, a dot may stick directly to the magnet actuator, or may be separated from the actuator but the use of a standoff material such as a foam, which has the benefit of absorbing shock and dampening noise transmitted to the user.

when used, the use of magnetic dots the motion of the dot can be detected as a secondary effect of the CTS. In this embodiment, the wire matrix of the CTS is already positioned such that the dots pass through it. The magnetic dot, upon passing through the CTS matrix, will cause a change in voltage that can be measured in the CTS in a manner similar to that of the normal operation of the CTS. This voltage change will be significantly different in characteristic from the voltage change induced by a finger or hand near the surface.

FIG. 19 shows one embodiment where magnetic dots are used in a CPA. The various embodiments of the CTS geometries shown herein without the magnetic dots apply in this case as well. Hence, the CTS strips could be above, below, embedded into, or comprising an X-Y matrix within the CPA.

In terms of user controls, in one embodiment the use of the DMDS could be used to allow selection of a row, column, character (cell) of Braille, or individual dot, by depressing one or more dots with the finger. Multiple presses of the dot or dots (such as in a "double-click" or "triple-click") could also be used to indicate more advanced selection controls such as begin selection, end selection, select-and-hold, select-and-drag, and so forth.

Further the DMDS can be used to create a positive feedback loop for determining if the dot physically moves when the electrical pulse is sent to the actuator. This could be used for automatic calibration of actuators, whereby a feedback loop is used to adjust the timing or characteristics of the electrical pulse sent to each individual dot actuator until the desired dot motion is accomplished physically. It could also be used for error detection, to alert the user if a dot was not performing as expected, or to allow the computer to automatically attempt to re-actuate the dot in the event that the dot did not move correctly.

If the CTS is used for the dual purposes of both detection of finger position and the DMDS, then a switching circuit may be needed to differentiate signals.

In one embodiment, the signal output from the CTS—tiny changes in voltages or currents—is measured continuously using traditional electronic techniques and the signal is processed using software to determine if any transition is due to random noise, a finger motion, a dot movement, or both a finger and dot movement combined.

In another embodiment, traditional Hall effect sensors are used for the DMDS. In this embodiment, a thin strip of metal—one of the metal strips of the CTS—has a current applied along it. In the presence of the magnetic field of the magnet actuator or the dot, the electrons in the metal strip are deflected toward one edge, producing a voltage gradient across the short side of the strip (perpendicular to the feed current). The Hall effect sensor can detect static (non-changing) magnetic fields, providing a mechanism to determine the current position of the dot, actuator, or both. Further, it can detect changes in the position of the dot, actuator, or both.

I various embodiments, the electronic circuitry can be located physically separate from the CTS itself, such that passive electronics only are on the CTS, which allows it to survive cleaning operations. The connection between the CTS and the sensors and/or electronics can be via physical pressure, standard connectors or cables, magnetic connectors, or by induction.

If the CTS is used for both purposes—the purpose of traditional capacitive touch detection and the purpose of dot motion detection, then a switching circuit may be employed. This circuit, which can be physically located separate from the CTS as described above, serves to switch the role of the CTS rapidly between capacitive touch and dot motion detection.

This can be done with a variety of duty cycles, and at a rate fast enough to allow for both operations to happen simultaneously. In one embodiment, the switching can be done at a rate of 1 Hz-100 Hz. Hence the user can enjoy the benefit of both features operating at the same time.

By alternating the signals coming from the CTS via this switching circuit, the two individual circuits used to analyze the capacitive touch detection and the dot motion detection can be made much simpler, using more traditional techniques, and the software processing requirements made much easier. Further, the latency of each process—both through circuitry and software—will be much less, allowing for a faster "polling rate" of the touch surface. Finally, this results in cheaper electronics which do not need to be as sensitive as in the case of continuous monitoring for dual purposes.

The uses of the terms "a" and "an" and "the" and similar references in the context of describing the invention (especially in the context of the following claims) are to be construed to cover both the singular and the plural unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

While the invention has been illustrated and described in detail in the drawings and the foregoing description, the same is to be considered as illustrative and not restrictive in character, it being understood that only the preferred embodiment has been shown and described and that all changes and modifications that come within the spirit of the invention are desired to be protected. In addition, all references cited herein are indicative of the level of skill in the art and are hereby incorporated by reference in their entirety.

EMBODIMENTS

The following provides an enumerated listing of some of the embodiments disclosed herein. It will be understood that this listing is non-limiting, and that individual features or combinations of features (e.g., 2, 3 or 4 features) as described in the Detailed Description above can be incorporated with the below-listed Embodiments to provide additional disclosed embodiments herein.

1. A tactile display comprising a capture plate assembly.
2. The tactile display of embodiment 1, wherein the capture plate assembly comprises an insulator top plate.
3. The tactile display of any one prior embodiment, wherein the capture plate assembly further comprises an actuator.
4. The tactile display of embodiment 3, wherein the actuator comprises a dot.
5. The tactile display of embodiment 4, wherein the dot comprises a Braille dot.
6. The tactile display of any one prior embodiment, wherein the capture plate assembly further comprises a stator.
7. The tactile display of embodiment 6, wherein said stator comprises a steel top plate.
8. The tactile display of any one prior embodiment, wherein the capture plate assembly further comprises a touch-sensitive surface.
9. The tactile display of any one prior embodiment, wherein the capture plate assembly comprises a membrane.
10. The tactile display of any one prior embodiment, wherein the capture plate assembly comprises a foam.
11. The tactile display of any one prior embodiment, wherein the capture plate assembly defines one or more openings.
12. The tactile display of embodiment 11, wherein said one or more openings comprise openings for screws, dots, Braille dots, or graphics dots.
13. The tactile display of any one prior embodiment, wherein the capture plate assembly further comprises one or more fasteners.
14. The tactile display of embodiment 13, wherein said fasteners are not visible to a user.
15. The tactile display of any one prior embodiment, wherein said capture plate assembly is removable from the tactile display.
16. The tactile display of embodiment 15, wherein said capture plate is assembly is reversibly removable from the tactile display.
17. A method for cleaning a tactile display comprising a removable capture plate assembly comprising the acts of removing said capture plate assembly from the tactile display.
18. The method of embodiment 17 further comprising washing or wiping the removed capture plate assembly.
19. The method of embodiment 18 further comprising replacing the capture plate assembly on the tactile display.
20. A method for cleaning a tactile display comprising the acts of over-driving one or more actuators.

21. The method of embodiment 20, wherein the over-driving of one or more actuators moves debris to a location where it can be removed from the tactile display.

What is claimed is:

1. A tactile display, comprising:
   a capture plate assembly including one or more display dots;
   a top assembly including one or more braille dots, wherein said top assembly is in mechanical communication with the capture plate assembly, and
   a membrane positioned between the capture plate assembly and the top assembly, wherein said membrane physically separates said one or more display dots of said capture plate assembly from said one or more braille dots of said top assembly so that said display dots do not contact said braille dots.

2. The tactile display of claim 1, wherein the capture plate assembly comprises an insulator top plate.

3. The tactile display of claim 1, wherein the capture plate assembly further comprises an actuator.

4. The tactile display of claim 3, wherein the actuator comprises a dot.

5. The tactile display of claim 4, wherein the dot comprises a Braille dot.

6. The tactile display of claim 1, wherein the capture plate assembly further comprises a stator.

7. The tactile display of claim 6, wherein said stator comprises a steel top plate.

8. The tactile display of claim 1, wherein the capture plate assembly further comprises a touch-sensitive surface.

9. The tactile display of claim 1, wherein the capture plate assembly comprises a foam.

10. The tactile display of claim 1, wherein the capture plate assembly defines one or more openings.

11. The tactile display of claim 10, wherein said one or more openings comprise openings for screws, dots, Braille dots, or graphics dots.

12. The tactile display of claim 1, wherein the capture plate assembly further comprises one or more fasteners.

13. The tactile display of claim 12, wherein said fasteners are not visible to a user.

14. The tactile display of claim 1, wherein said capture plate assembly is removable from the tactile display.

15. The tactile display of claim 14, wherein said capture plate is assembly is reversibly removable from the tactile display.

16. A method for cleaning a tactile display comprising the acts of:
   removing a capture plate assembly including one or more display dots from the tactile display, wherein said tactile display includes a top assembly comprising one or more Braille dots;
   cleaning said capture plate assembly; and
   replacing said capture plate assembly on the tactile display, wherein said capture plate assembly is positionable atop said top assembly so that said top assembly is in mechanical communication with said capture plate assembly.

17. The method of claim 16 wherein cleaning said capture plate assembly includes washing or wiping the removed capture plate assembly.

18. A method for cleaning a tactile display comprising the acts of over-driving one or more actuators.

19. The method of claim 18, wherein the over-driving of one or more actuators moves debris to a location where it can be removed from the tactile display.

* * * * *